United States Patent
Blankenstein et al.

(10) Patent No.: US 6,240,304 B1
(45) Date of Patent: May 29, 2001

(54) MOBILE TERMINAL HAVING RF POWER CONSUMPTION OPTIMIZATION OF EXTENDED STANDBY MODE

(75) Inventors: Janne Blankenstein; Seppo Alanara, both of Oulu (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/022,109

(22) Filed: Feb. 11, 1998

(51) Int. Cl.⁷ .................................................. H04B 1/38

(52) U.S. Cl. ........................ 455/574; 455/38.3; 455/343

(58) Field of Search ........................... 370/311; 455/38.3, 455/343, 574, 311

(56) References Cited

U.S. PATENT DOCUMENTS

| | | | |
|---|---|---|---|
| 4,029,900 | 6/1977 | Addeo | 178/69.1 |
| 4,592,076 | 5/1986 | El-Banna | 375/108 |
| 4,777,655 | 10/1988 | Numata et al. | 455/76 |
| 4,903,319 | 2/1990 | Kasai et al. | 455/33 |
| 5,027,428 | 6/1991 | Ishiguro et al. | 455/67 |
| 5,031,231 | 7/1991 | Miyazaki | 455/54 |
| 5,144,296 | 9/1992 | DeLuca et al. | 340/825.44 |
| 5,173,927 | 12/1992 | Strommer et al. | 375/81 |
| 5,175,874 | 12/1992 | Auchter | 455/89 |
| 5,224,152 | 6/1993 | Harte | 379/59 |
| 5,241,284 | 8/1993 | Nyqvist et al. | 330/297 |
| 5,241,542 | 8/1993 | Natarajan et al. | 370/95.3 |
| 5,265,270 | 11/1993 | Stengel et al. | 455/343 |
| 5,291,542 | 3/1994 | Kivari et al. | 379/58 |
| 5,293,639 | 3/1994 | Wilson et al. | 455/17 |
| 5,378,935 | 1/1995 | Korhonen et al. | 327/114 |
| 5,396,653 | 3/1995 | Kivari et al. | 455/88 |
| 5,404,355 | * 4/1995 | Raith | 370/311 |
| 5,406,613 | * 4/1995 | Peponides et al. | 455/574 |
| 5,416,435 | 5/1995 | Jokinen et al. | 327/113 |
| 5,430,740 | 7/1995 | Kivari et al. | 371/37.1 |
| 5,471,655 | 11/1995 | Kivari | 455/127 |
| 5,491,718 | 2/1996 | Gould et al. | 375/205 |
| 5,551,078 | 8/1996 | Connell et al. | 455/343 |
| 5,566,357 | 10/1996 | Holeman | 455/54.1 |
| 5,568,513 | 10/1996 | Croft et al. | 375/224 |
| 5,570,353 | 10/1996 | Keskitalo et al. | 370/18 |
| 5,570,369 | 10/1996 | Jokinen | 370/95.3 |

(List continued on next page.)

FOREIGN PATENT DOCUMENTS

| | | |
|---|---|---|
| 2 086 106 | 5/1982 | (GB) . |
| WO88/05248 | 7/1988 | (WO) . |
| WO92/19049 | 10/1992 | (WO) . |

*Primary Examiner*—Edward F. Urban
*Assistant Examiner*—Blane J. Jackson
(74) *Attorney, Agent, or Firm*—Ohlandt, Greeley, Ruggiero & Perle, LLP

(57) ABSTRACT

A method of this invention operates a mobile station, such as a cellular radiotelephone, of a type that is bidirectionally coupled to a system through an RF interface. The method includes a first step of receiving a first portion of a message word from an analog control channel (ACC); determining from the received first portion if the message word is a predetermined type of message word; and, if the message word is determined to be the predetermined type of message word, terminating the reception of the message word so as not to receive a second portion of the message word, thereby reducing the power consumption of the mobile station. In the preferred embodiment of this invention the predetermined type of message word is a control-filler message, and the second portion of the message word is comprised of a parity bits portion. The step of determining includes a step of comparing less than a total number of bits (e.g., 18 bits) of the received first portion of the message word, or all of the bits (28 bits), to a set of bits that are known to uniquely identify the predetermined type of message word. The method may include a step of periodically updating the set of bits, such as when the mobile station enters a new paging ACC.

26 Claims, 4 Drawing Sheets

U.S. PATENT DOCUMENTS

| | | | |
|---|---|---|---|
| 5,577,024 | 11/1996 | Malkamaki et al. | 370/18 |
| 5,581,244 | 12/1996 | Jokimies et al. | 340/825.44 |
| 5,606,548 | 2/1997 | Vayrynen et al. | 370/252 |
| 5,613,235 | 3/1997 | Kivari et al. | 455/343 |
| 5,642,063 | 6/1997 | Lehikoinen | 327/74 |
| 5,682,093 | 10/1997 | Kivela | 323/273 |
| 5,708,656 | 1/1998 | Noneman et al. | 370/320 |
| 5,726,981 | 3/1998 | Ylitervo et al. | 370/332 |
| 5,745,503 | 4/1998 | Kuusinen | 371/37.1 |
| 5,745,860 * | 4/1998 | Kallin | 455/574 |
| 5,752,201 * | 5/1998 | Kivari | 455/574 |
| 5,794,137 * | 8/1998 | Harte | 455/343 |
| 5,905,965 * | 5/1999 | Asano et al. | 455/574 |
| 5,918,170 * | 6/1999 | Oksanen et al. | 455/343 |
| 5,978,366 * | 11/1999 | Massingill et al. | 370/337 |

* cited by examiner

MOBILE TERMINAL HAVING RF POWER CONSUMPTION OPTIMIZATION OF EXTENDED STANDBY MODE

FIELD OF THE INVENTION

This invention relates generally to radiotelephones and, in particular, to mobile terminals such as those capable of operation with a cellular network.

BACKGROUND OF THE INVENTION

In certain types of cellular radio communication systems, such as one specified by EIA/TIA-553, a forward analog control channel (FOCC) is a continuous wideband data stream sent from a base station to a mobile terminal or station. This data stream is generated at a 10 kilobit/second ±0.1 bit/second rate. FIG. 1A depicts the format of the FOCC data stream.

Each forward analog control channel consists of three discrete information streams referred to as stream A, stream B, and a busy-idle stream. These three information streams are time-multiplexed together. Messages to mobile stations with the least significant bit of their mobile identification number equal to "0" are sent on stream A, and those with the least-significant bit of their mobile identification number equal to "1" are sent on stream B. Thus, a given mobile station monitors only stream A or stream B. The busy-idle stream contains busy-idle bits (shown as arrows in FIG. 1A) which are used to indicate the current status of the reverse control channel. The reverse control channel is busy if the busy-idle bit is equal to "0", and idle if the busy-idle bit is equal to "1". A busy-idle bit is located at the beginning of each dotting sequence, at the beginning of each word sync sequence, at the beginning of the first repeat of word A, and after every 10 message bits thereafter.

A 10-bit dotting sequence (1010101010) and an 11-bit sync sequence (11100010010) are sent to permit mobile stations to achieve synchronization with the incoming data. Each word contains 40 bits, including parity, and is repeated five times. The repeated word is referred to as a word block or as a frame. For a multi-word message, the second word block and subsequent word blocks are formed the same as the first word block, including the 10-bit dotting and 11-bit word synchronization sequences. A word is formed by encoding 28 content bits into a (40, 28) Bose-Chaudhuri-Hocquenghem (BCH) code that has a distance of 5, (40, 28; 5). The left-most bit (i.e., earliest in time) is designated as the most-significant bit. The 28 most-significant bits of the 40-bit field are defined to be the content bits. The generator polynomial for the (40, 28; 5) BCH code is:

$$g_B(x) = X^{12} + X^{10} + X^8 + X^5 + X^4 + X^3 + X^0.$$

The code, a shortened version of the primitive (63, 51; 5) BCH code, is a systematic linear block code with the leading bit as the most significant information bit and the least-significant bit as the last parity-check bit.

Each FOCC message can consist of one or more words, and can thus be transmitted over one or more frames. The types of messages transmitted over the forward control channel are mobile station control messages, overhead (OHD) messages, and control-filler messages.

A three-bit OHD field is used to identify the overhead message types. Overhead message type codes can be grouped into the following functional classes: a system parameter overhead message, a global action overhead message, a registration identification message, a control-filler message, and a digital control channel information message.

Overhead messages are sent in a group called an overhead message train (OMT). The first message of the train is the system parameter overhead message (SPOM). The desired global action messages or registration ID message or Digital Control Channel Information message are appended to the end of the system parameter overhead message. The total number of words in an overhead message train is one or more than the value of a NAWC field contained in the first word of the system parameter overhead message. The last word in the overhead message train is identified by a "1" in the END field of that word; the END field of all other words in the train is set to "0". For NAWC-counting purposes, any inserted control-filler messages are not counted as part of the overhead message train.

The system parameter overhead message (SPOM) is sent every 0.8±0.3 seconds on each of the control channels. The global action message, registration identification message and Digital Control Channel Information message are sent on an as needed basis.

Referring now also to FIG. 1B, the control-filler message is defined to be one word having 28 data bits and 12 parity bits. It is sent whenever there is no other message to be sent on the forward control channel. It may be inserted between messages, as well as between word blocks (frames) of a multi-word message. The control-filler message is chosen so then when it is sent, the 11-bit word sync sequence (11100010010) will not appear in the message stream, independent of the busy-idle bit status.

The following table illustrates the format of the control-filler message as defined in the IS-136.2, Rev. 0, specification (May 17, 1995).

| Information Element | Length (bits) |
|---|---|
| $T_1T_2$ = 11 | 2 |
| DCC | 2 |
| 010111 | 6 |
| CMAC | 3 |
| SDCC1 | 2 |
| 11 | 2 |
| SDCC2 | 2 |
| 1 | 1 |
| WFOM | 1 |
| 1111 | 4 |
| OHD-001 | 3 |
| P | 12 |

The interpretation of the data fields is as follows:

$T_1T_2$ Type field, Set to 11 indicating overhead word

DCC Digital color code field

CMAC Control mobile attenuation field. Indicates the mobile station power level associated with the reverse control channel, and is used by the mobile station when accessing the system on the reverse control channel

SDCC1,

SDCC2 Supplementary Digital Color Codes. If the Supplementary Digital Color Code feature is utilized, the combination of SDCC1 and SDCC2 transmitted by the base station must be a non-zero number. Mobile stations which respond with a non-zero supporting SDCC combination are capable of supporting SDCC. Mobile stations which respond with a zero SDCC combination are not capable of supporting SDCC. The zero SDCC combination is used to indicate either that SDCC1 and SDCC2 are not used or are not supported.

WFOM Wait-for-overhead-message field which indicates whether the mobile station must read an overhead message train (OMT) before accessing the system OHD Overhead Message Type field, Set to 001 for indicating the control-filler word P Parity field The control-filler messages are generally not required unless the mobile station is powered up and/or if a call is to be made. However, typically 50% to 70% (or more) of received messages are control-filler messages. The exact number sent during any given period is a function of system loading. As more mobile stations are being serviced by the system fewer control-filler messages are transmitted, and vice versa.

As may be appreciated, the reception of the FOCC, or the Analog Control Channel (ACC) in a dual mode analog/digital system such as that specified in IS-136, consumes some amount of battery power of the mobile terminal. The conservation of battery power is an important goal in the design and operation of a mobile terminal, in particular a cellular radiotelephone.

Reference can be had to the following patents for teaching various aspects of power saving in a mobile terminal: commonly assigned U.S. Pat. Nos. 5,291,542, 5,396,653, and 5,613,235 by Raimo Kivari et al., and U.S. Pat. No. 5,471,655, by Raimo Kivari. Reference may also be had to U.S. Pat. Nos. 5,224,152, 5,175,874, 4,592,076 and 4,029,900.

For example, in U.S. Pat. No. 5,471,655 Kivari describes an extended standby (XSTBY) mode of operation for conserving battery power, while in U.S. Pat. No. 5,613,235 Kivari et al. describe a synchronous XSTBY mode of operation. In the standby mode of operation the mobile station monitors the FOCC or ACC for a paging message or for other information. Since the mobile station must be at least intermittently powered during the monitoring times, some battery power consumption occurs. These commonly assigned patents teach various techniques for reducing the battery drain, and thereby extending the time between battery rechargings.

In commonly assigned U.S. patent application Ser. No. 08/599,144, Feb. 9, 1996, entitled "Mobile Terminal Having Power Saving Mode That Monitors Specified Numbers of Filler Messages", by Raimo Kivari, there is described a technique to eliminate the reception of control-filler messages based at least in part on an improved messaging function wherein a mobile station is informed from the base station of a number of consecutive control-filler messages that will be transmitted.

In conventional implementations of the analog control channel (ACC) reception mode the standby time is significantly shorter than the standby time when operating in the digital mode with a digital control channel (DCCH). This is due to the fact that in the analog mode (ACC/Extended Standby, XSTBY) the mobile station RF circuitry is powered for a longer time (e.g., 16%–100%) as compared to operation in the digital mode (minimum about 1%).

OBJECTS AND ADVANTAGES OF THE INVENTION

It is a first object and advantage of this invention to provide an improved XSTBY mode of operation for a mobile station.

It is a second object and advantage of this invention to provide a mobile station that is responsive to a receipt of a message on an analog control channel for detecting that the message is a predetermined type of message, such as a control-filler message, and for then turning off at least a portion of the receiver during the reception of the control-filler message, preferably before the reception of the parity portion of the control-filler message.

SUMMARY OF THE INVENTION

The foregoing and other problems are overcome and the objects and advantages are realized by methods and apparatus in accordance with embodiments of this invention. A method of this invention is disclosed for operating a mobile station, such as a cellular radiotelephone, of a type that is bidirectionally coupled to a system through an RF interface. The method includes a first step of receiving a first portion of a message word from an analog control channel (ACC); determining from the received first portion if the message word is a predetermined type of message word; and, if the message word is determined to be the predetermined type of message word, terminating the reception of the message word so as not to receive a second portion of the message word, thereby reducing the power consumption of the mobile station.

In the preferred embodiment of this invention the predetermined type of message word is a control-filler message, and the second portion of the message word is comprised of a parity bits portion.

The step of determining includes a step of comparing less than a total number of bits (e.g., 18) of the received first portion of the message word, or all of the bits (28), to a set of bits that are known to uniquely identify the predetermined type of message word. In accordance with an aspect of this invention the method includes a step of periodically updating the set of bits, such as when the mobile station enters a new paging ACC.

Further in accordance with the teachings of this invention the method may include a step of inhibiting the reception of second words of multi-word messages from the ACC and/or inhibiting the reception of repeats of message words from the ACC.

Further in accordance with a method of this invention power consumption can be further reduced by executing the steps of receiving at least a first portion of a second type of message word from the ACC (for example, a SPOM); comparing the received first portion of the second type of message word to an already stored first portion of the second type of message word; and, upon a match, terminating the reception of the second type of message word so as not to receive a second portion of the second type of message word. Power consumption can be even further reduced by also inhibiting the reception of a repeat of the second type of message word from the ACC.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

The disclosures of the commonly assigned U.S. Pat. Nos. 5,471,655 and 5,613,235 are incorporated by reference herein in their entireties.

Figure 1A:
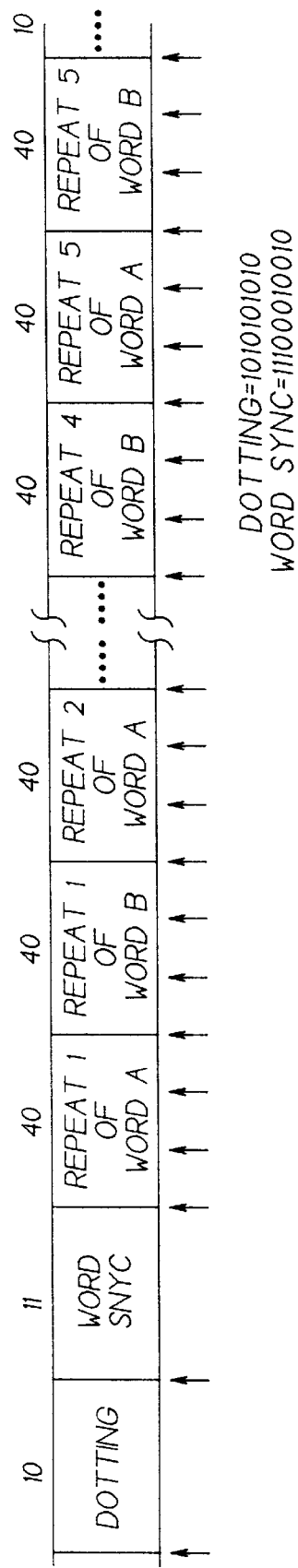
FIG. 1A illustrates a frame of information that is transmitted to a mobile terminal on an analog control channel (ACC) in accordance with the prior art.
Figure 1B:
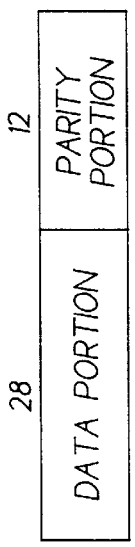
FIG. 1B illustrates the format of a control-filler message that is transmitted over the ACC.
Figure 2:
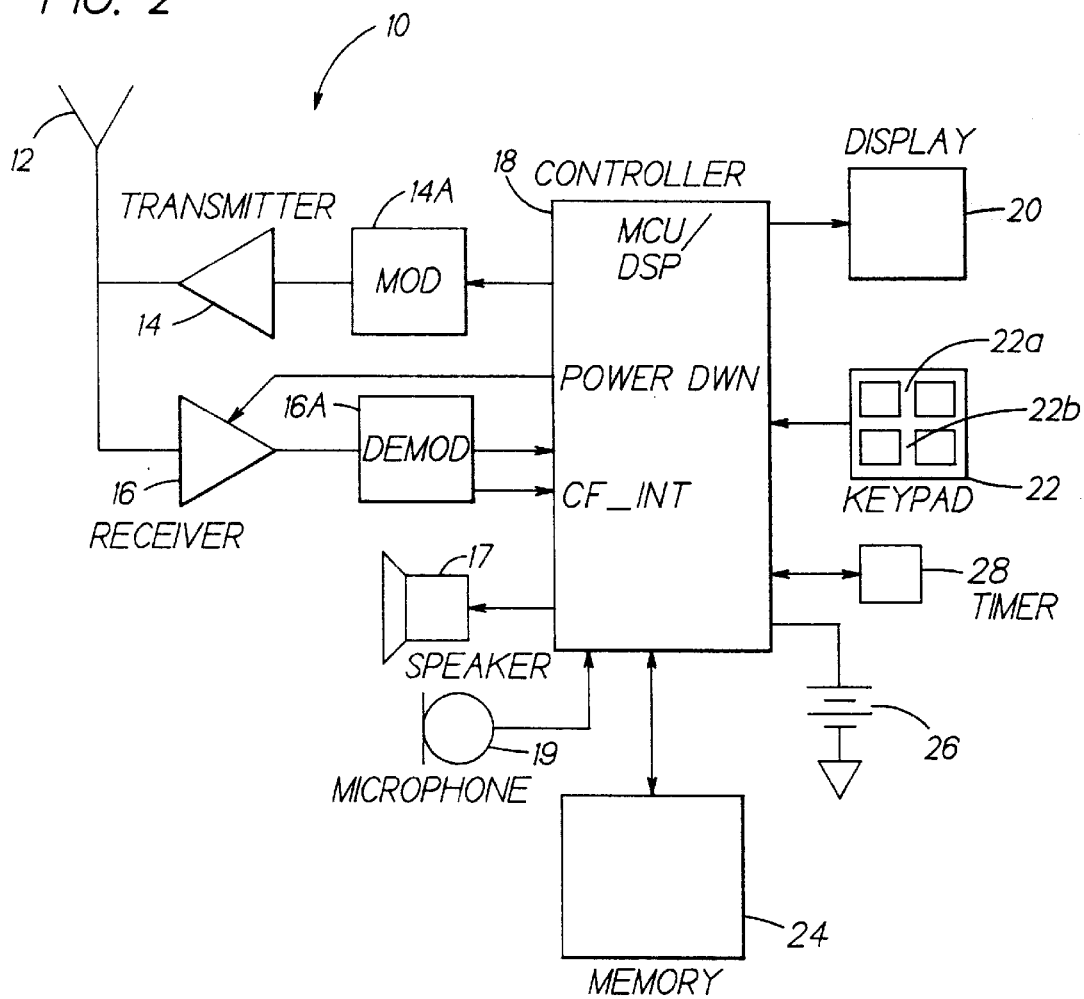
FIG. 2 is a block diagram of a mobile terminal that is constructed and operated in accordance with this invention.
Figure 3:
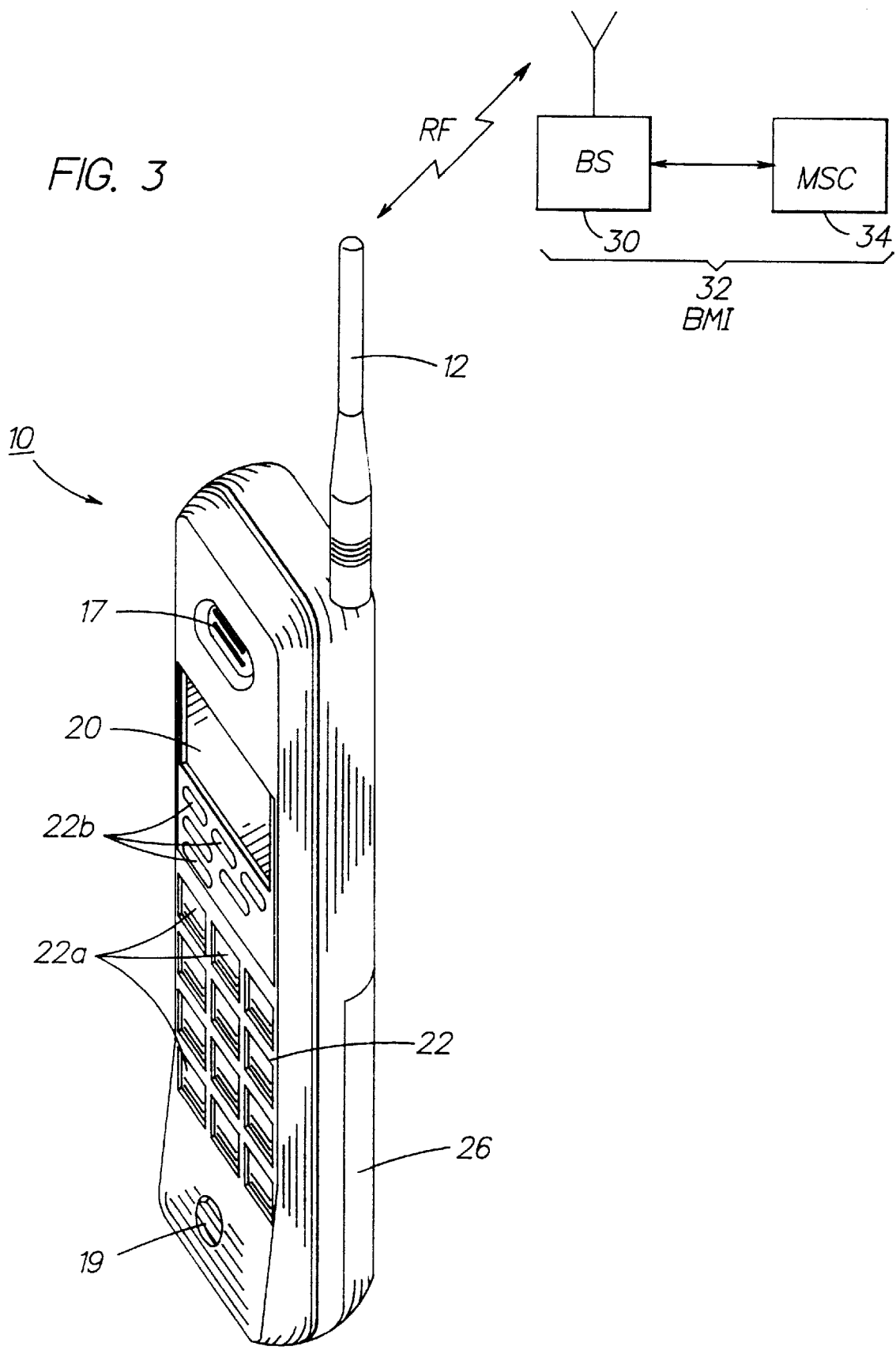
FIG. 3 is an elevational view of the mobile terminal shown in FIG. 2, and which further illustrates a cellular communication system to which the mobile terminal is bidirectionally coupled through wireless RF links.

Reference is made to FIGS. 2 and 3 for illustrating a mobile terminal 10, in particular a cellular radiotelephone, that is suitable for practicing this invention. The mobile terminal 10 includes an antenna 12 for transmitting signals to and for receiving signals from a base site or base station 30. The base station 30 is a part of a cellular network comprising a base station/mobile switching center/interworking function (BMI) 32 that includes a Mobile Switching Center (MSC) 34. The MSC 34 provides a connection to landline trunks when the mobile terminal 10 is registered with the network.

The mobile terminal includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The controller 18 typically is comprised of a microcontroller unit (MCU) and a high speed digital signal processor (DSP) that cooperate to control the overall operation of the mobile station 10. The DSP may implement the receiver demodulator 16A, also referred to herein as a RxModem 16A, or the RXModem 16A may be implemented in dedicated hardware, such as part of an ASIC.

A user interface includes a conventional speaker 17, a conventional microphone 19, a display 20, and a user input device, typically a keypad 22, all of which are coupled to the controller 18. The keypad 22 includes the conventional numeric (0–9) and related keys (#,*) 22a, and also other keys 22b used for operating the mobile terminal 10. These other keys 22b may include, by example, a SEND key, various menu scrolling and soft keys, and a PWR key.

The mobile terminal 10 also includes a battery 26 for powering the various circuits that are required to operate the terminal, and a timer 28 that is programmably set by the controller 18, and that generates an interrupt to the controller 18 after the expiration of the programmed interval of time. In this regard, the controller 18 is capable of entering a low power mode of operation, and is capable of staying in the low power mode until interrupted by the timer 28.

The mobile terminal 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that are received from the BMI 32 prior to the display of the messages to the user. The memory 24 also includes routines for implementing the method described below in relation to FIG. 4.

It should be understood that the mobile terminal 10 can be a vehicle mounted or a handheld device. It should further be appreciated that the mobile terminal 10 can be capable of operating with one or more air interface standards, modulation types, and access types. By example, the mobile terminal may be capable of operating in accordance with a frequency modulated (FM), frequency division multiple access (FDMA) transmission and reception standard, such as EIA/TIA-553. The terminal may also be capable of operating with any of a number of other standards that include a same or similar FM analog functionality, such as dual-mode mobile stations that also include digital functionality. A dual mode AMPS/GSM mobile station may benefit from the teachings of this invention, as may EIA/TIA 627, IS-136, and IS-95 (CDMA) phones. It should thus be clear that the teaching of this invention is not to be construed to be limited to any one particular type of mobile terminal or air interface standard.

In a preferred embodiment of this invention the mobile terminal 10 is enabled to enter the reduced power or quiescent (sleep) mode to conserve battery power. The reduced power mode can include placing the controller 18 in a sleep mode, and/or selectively removing or reducing operating power to various components, such as the transmitter 14, modulator 14A, receiver 16, demodulator 16A, audio path components, the display 20, etc.

Figure 4:
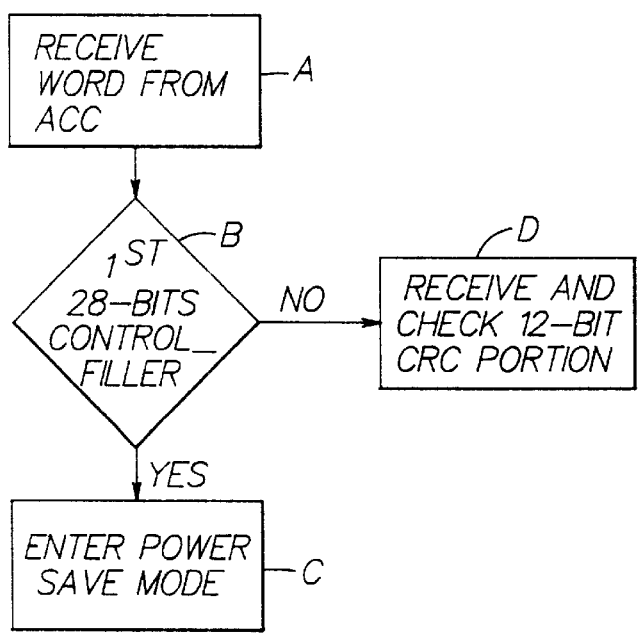
FIG. 4 is a logic flow diagram that illustrate a method executed by the mobile terminal shown in FIGS. 2 and 3.

Referring to FIG. 4, the mobile terminal 10 in accordance with this invention executes a method for extending the standby time when operating on an analog control channel (ACC), and may be an IS-136 compatible mobile station. The method includes steps of (A) receiving a first portion of a control word on the forward control channel (e.g. a first portion of a control-filler word or the like in the first repeat). While receiving the control word the mobile station 10 (B) checks the received bits of the control word in a register to find a valid matching control word and, if a valid matching control word is found, then (C) enters the power save mode leaving the control-filler message check portion unreceived and undetected. If the result of the comparison at step B is No, then control passes instead to Block D to continue receiving and then checking the 12-bit parity portion (e.g., an appended CRC).

In one currently implemented embodiment, when in the XSTBY mode of operation the received data is recognized by the RxModem block 16A which always receives at least the first repeat (Repeat1) containing all 44 bits, and which requires a total 4.4 ms to receive. Excluding the Busy/Idle bits, the first 28 data bits are actual, valid data and the last 12 data bits are for error detection and correction purposes (e.g., a CRC). After receiving all of the bits the RxModem 16A determines whether the data is a control-filler message. If it is, the controller 18 may enable a control-filler message skipping feature for the remainder of the repeats.

The DSP is required to be powered up in every analog control channel frame, since it is not possible to know beforehand whether a particular message is a control-filler message or some other message. However, the inventors have recognized that the control-filler message is constructed such that it can be recognized before the end of Repeat1, i.e., there are five bits which are unique to this message (T1T2 and the OHD field), having a minimum distance of one to a closest other message. The control-filler message also contains 13 other constant bits which may, however, also occur in other messages. It is assumed that the possibility of an erroneous interpretation of a total 18 bits is highly improbable. This being the case, the inventors have further realized that it is possible to unambiguously recognize that a particular received message is a control-filler message before receiving the entire message, and to thus terminate the reception of the message before receiving all or at least a part of the check information (e.g., the 12-bit parity field). As such, the mobile station 10 operates to terminate reception and turn the RF components off after the first 28 data bits are received, and thus does not receive the 12-bit data integrity check or parity portion.

As an example of the utility of this invention, the XSTBY mode current consumption can be estimated to be about 20 mA, averaged over 46.3 ms (analog mode frame). The RF circuits current consumption when ON is 45 mA. A minimum current consumption during sleep time is 2.3 mA.

For the first repeat (Repeat1) there are 28 bits of data plus 12 bits of CRC plus four bits of Busy/Idle for a total of 44 bits, or 4.4 ms. A specified value of RF circuit settling time is 3.0 ms, for a total of 7.4 ms. In accordance with this invention, when removing the 12 CRC bits plus one Busy/Idle bit, for a total of 13 bits or 1.3 ms, from the RF ON time the total RF ON time savings is 1.3 ms/7.4 ms or 17.6%.

If one assumes that the size of the battery 26 is 1000 mAh, then the following current savings can be realized for two different values of RF settling time.

| RF settle time | Current implementation | New Implementation |
| --- | --- | --- |
| 4.0 ms | 36.3 h / 51.2 h | 37.7 h / 54.9 h |
| 3.0 ms | 37.4 h / 54.0 | 38.9 h / 58.0 h |

These results are expressed in standby times (80%/100%) without taking into account the control-filler message vs. valid data percentage.

It can be seen that the advantage obtained by powering down the RF sections earlier than is conventionally done is about 1.5 h when in the 80% XSTBY mode (assuming that the mobile station 10 is on the ACC and 80% of the time is in XSTBY).

If the control-filler percentage is taken into account, and if it is assumed that 50% to 70% of the messages on the ACC are control-filler messages, one obtains the result of a 45 minute to one hour increase in overall standby time, which is a significant improvement.

To implement the teaching of this invention it is preferred that the RxModem 16A be constructed so as to detect the 18 constant bits of the control-filler message, and to further provide the controller 18 with an additional interrupt (CF_INT) which is asserted after the 28 th data bit, if the received data has been detected as being a control-filler message. Also, a frame time counter (FTC) value at this point should be latched to a FTC correction register, which the controller 18 uses to calculate a next RxModem 16A start time.

Figure 5:
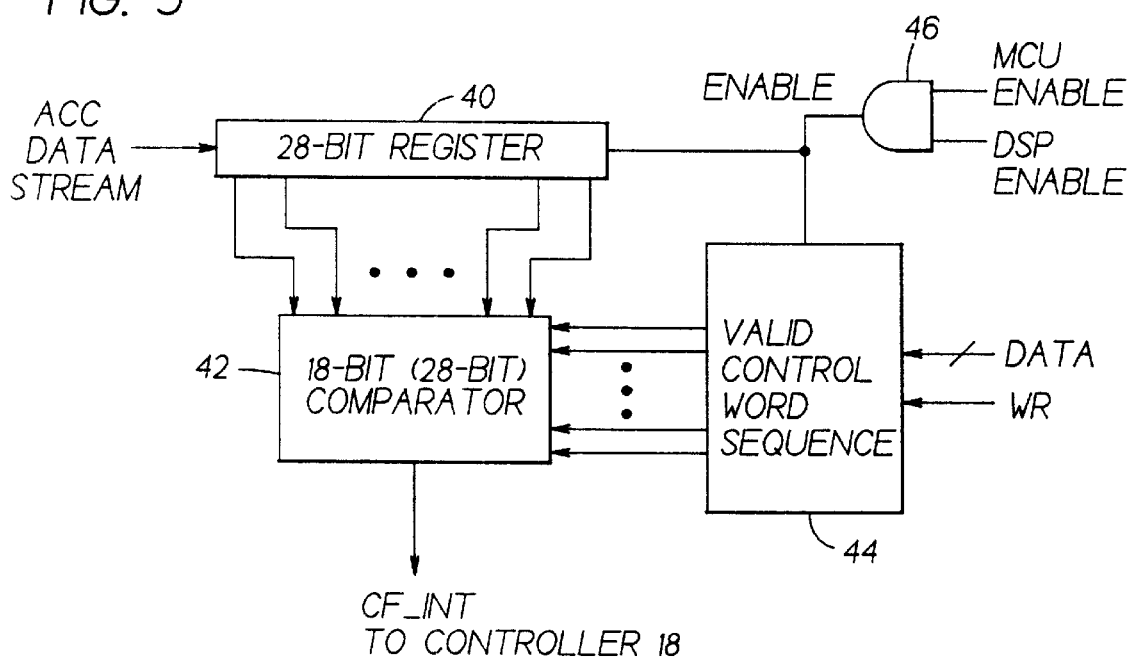
FIG. 5 is a circuit block diagram of a portion of the mobile station demodulator shown in FIG. 2.

Referring to FIG. 5, the RxModem 16A includes a 28-bit register 40 wherein the first repeat of the received ACC data stream is stored. At the output of the register 42 is a comparator 42, either 18-bit or 28-bit, which also receives inputs from a valid control word sequence storage device 44. The comparator 42 compares the first-received 28-bits from the ACC to the stored sequences to determine if the received control word is a control-filler message. If it is, the CF_INT is asserted to the controller 18, which then initiates the powering-down of the RF and other circuitry that is not further required. The operation of the illustrated circuitry can be selectively enabled or disabled by an Enable signal generated by logic 46 (shown by convenience as an AND gate). If disabled, then the entire control word is received in a conventional manner. In a preferred, but not limiting, embodiment both the MCU and the DSP are provided with separate enable bits, both of which need to be asserted in order to enable the operation of the circuitry.

Only slight modifications are required to the DSP itself in order to implement the teachings of this invention, specifically in the start time calculation programmed into the timer 28 and when to enter the sleep function.

Further in accordance with the teaching of this invention the foregoing embodiment can be enhanced using one or more of the following three methods.

In a first enhancement the comparator function is made programmable, such as by enabling the valid control word sequence storage device 44 to be written by the DSP or the MCU using a Data input and write (WR) interface, and by providing a full 28-bit comparator function. This technique minimizes the possibility of other messages, having one or more erroneous bits, being identified as a control-filler message. The storage device 44 can be updated after entry to each new paging ACC. In this way the mobile station 10 always has updated contents of the control-filler message, and if the access channel is the same as the paging channel and WFOM=0, the mobile station can make an access without reading the control-filler first. As was described previously, the WFOM information element is used to specify whether a mobile station must wait for an Overhead Message Train before accessing a system on the reverse ACC.

In a second enhancement, particularly useful when the system is busy and most of ACC messages are mobile station control messages (not control-filler messages), the mobile station 10 may skip the second words of multi-word messages if no page match is found in the first word. In this case the parity information must also be checked since, without checks, bit errors in the T1T2 field may cause false non-matched Mobile Station Control Messages (MSCM). If there is a page match for the Mobile Station Identification bits (MIN1-bits), the remaining words of the message must be read as well. During high traffic times the overall power savings are greater using this technique than that obtained from only skipping the parity portion of the control-filler messages.

It should be noted that it is possible that the base station 30 may also send control-filler messages between mobile station control message words. This may result in a condition that one control-filler message is skipped instead of the second word of multi-word message, but this has no effect on the overall receive time saving. However, the mobile station 10 is preferably enabled to recover from this situation and simply ignore the unexpected second word. The control logic is thus enabled to ignore the following words of a multi-word message. The savings can then be applied to the remaining words after the third word, since these can also be skipped based on the NAWC value (which indicates a number of words in a message). In the hardware the skipping of these additional words does not require comparators, but is based instead on the control software detecting the non-match in the first Mobile Station Control Message (abbreviated address). It is preferred that the controlling logic be implemented in the DSP software to enable high speed operation.

Further in this regard the mobile station 10 may skip remaining words (except the first) in multi-word messages. For this case two first words must be received correctly with their parity checks passed, and the remaining words (based on NAWC) are then skipped in the RX_Modem 16A. The resulting power savings are dependent on the type of traffic in the network: if the ACC has many multi-word messages the savings may be larger than in the case discussed immediately above.

In a third enhancement the mobile station 10 may skip SPOMs (System Parameter Overhead Messages) after reading and updating the SPOM contents of the current paging channel. The memory 24 includes a location for storing the SPOM contents of the current paging channel. Having once received and verified the SPOM information, and stored same in the memory 24, the reception of the parity portions of subsequent SPOMs can be inhibited, as can entire repeats of the SPOM. Further in this regard the SPOM is repeated as two words with a repeat period of 0.6 to 1.1 seconds. The resulting savings in receiver power can be understood as follows. During one second the mobile station 10 receives 22 messages. Of these two messages are SPOM, and 28 bits of the first word of the SPOM are received to verify the 28 message bits by comparing same to the bits stored in the memory 24. Assuming that the received portion of the SPOM is verified, the 12 parity bits of the first word can then be skipped, along with the entire next 40 bit SPOM word (SPOM2). In this case the standby savings is greater than 6% during high traffic periods and about 8% during low traffic periods. The savings percentage is improved in the low traffic case since most received words are control-filler messages which, in accordance with this invention, only 28 bits of which are received.

It should be noted that the power saving calculations are based on a one second period between SPOM messages. As with several of the preceding embodiments, the RX-Modem 16A synchronization should stay within 0.5 bit accuracy after skipping the next word.

In this enhancement of the invention power consumption is further reduced by executing the steps of receiving at least a first portion of the SPOM from the ACC; comparing the received first portion of the SPOM to an already stored first portion of the SPOM; and, upon a match, terminating the reception of the SPOM so as not to receive the parity bits portion. The reception of the repeat of the SPOM can also be inhibited, leading to even further power savings.

While the invention has been particularly shown and described with respect to preferred embodiments thereof, it will be understood by those skilled in the art that changes in form and details may be made therein without departing from the scope and spirit of the invention.

What is claimed is:

1. A method for operating a mobile station of a type that can be bidirectionally coupled to a network through a wireless interface, comprising the steps of:

receiving a first portion of a message word from an analog control channel (ACC);

determining from the received first portion if the message word is a predetermined type of message word; and if the message word is determined to be the predetermined type of message word, terminating the reception of the message word so as not to receive a second portion of the message word, thereby reducing the power consumption of the mobile station, wherein the predetermined type of message word is a control-filler message, and wherein the second portion of the message word is comprised of a parity bits portion.

2. A method for operating a mobile station of a type that can be bidirectionally coupled to a network through a wireless interface, comprising the steps of:

receiving a first portion of a message word from an analog control channel (ACC);

determining from the received first portion if the message word is a predetermined type of message word that is broadcast to a plurality of mobile stations and that specifies certain network-related information; and if the message word is determined to be the predetermined type of message word, terminating the reception of the message word so as not to receive a second portion of the message word, thereby reducing the power consumption of the mobile station, wherein the predetermined type of message word is a control-filler message, wherein the first portion of the message word is comprised of 28 data bits, and wherein the second portion of the message word is comprised of 12 parity bits.

3. A method for operating a mobile station of a type that can be bidirectionally coupled to a network through a wireless interface, comprising the steps of:

receiving a first portion of a message word from an analog control channel (ACC);

determining from the received first portion if the message word is a predetermined type of message word; and if the message word is determined to be the predetermined type of message word, terminating the reception of the message word so as not to receive a second portion of the message word, thereby reducing the power consumption of the mobile station, wherein the step of determining includes a step of comparing less than a total number of bits of the received first portion of the message word to a set of bits that are known to uniquely identify the predetermined type of message word.

4. A method for operating a mobile station of a type that can be bidirectionally coupled to a network through a wireless interface, comprising the steps of:

receiving a first portion of a message word from an analog control channel (ACC);

determining from the received first portion if the message word is a predetermined type of message word that is broadcast to a plurality of mobile stations and that specifies certain network-related information; and if the message word is determined to be the predetermined type of message word, terminating the reception of the message word so as not to receive a second portion of the message word, thereby reducing the power consumption of the mobile station, wherein the first portion of the message word is comprised of 28 bits, and wherein the step of determining includes a step of comparing less than 28 bits of the received first portion of the message word to a set of bits that are known to uniquely identify the predetermined type of message word.

5. A method as in claim 4, wherein the set of bits is comprised of 18 bits.

6. A method for operating a mobile station of a type that can be bidirectionally coupled to a network through a wireless interface, comprising the steps of:

receiving a first portion of a message word from an analog control channel (ACC);

determining from the received first portion if the message word is a predetermined type of message word that is broadcast to a plurality of mobile stations and that specifies certain network-related information; and if the message word is determined to be the predetermined type of message word, terminating the reception of the message word so as not to receive a second portion of the message word, thereby reducing the power consumption of the mobile station, wherein the first portion of the message word is comprised of 28 bits, and wherein the step of determining includes a step of comparing all 28 bits of the received first portion of the message word to a set of bits that are known to uniquely identify the predetermined type of message word.

7. A method for operating a mobile station of a type that can be bidirectionally coupled to a network through a wireless interface, comprising the steps of:

receiving a first portion of a message word from an analog control channel (ACC);

determining from the received first portion if the message word is a predetermined type of message word: and if the message word is determined to be the predetermined type of message word, terminating the reception of the message word so as not to receive a second portion of the message word, thereby reducing the power consumption of the mobile station, wherein the step of determining includes a step of comparing at least some number of bits of the received first portion of the message word to a set of bits that are known to represent the predetermined type of message word, and further comprising a step of periodically updating the set of bits.

8. A method as in claim 7, wherein the step of updating occurs when the mobile station enters a new paging ACC.

9. A method for operating a mobile station of a type that can be bidirectionally coupled to a network through a wireless interface, comprising the steps of:

receiving a first portion of a message word from an analog control channel (ACC);

determining from the received first portion if the message word is a predetermined type of message word;

if the message word is determined to be the predetermined type of message word, terminating the reception of the message word so as not to receive a second portion of the message word, thereby reducing the power consumption of the mobile station, and further reducing power consumption by inhibiting the reception of repeats of message words from the ACC.

10. A method for operating a mobile station of a type that can be bidirectionally coupled to a network through a wireless interface, comprising the steps of:

receiving a first portion of a message word from an analog control channel (ACC);

determining from the received first portion if the message word is a predetermined type of message word; and if the message word is determined to be the predetermined type of message word, terminating the reception of the message word so as not to receive a second portion of the message word, thereby reducing the power consumption of the mobile station, and further reducing power consumption by the steps of:

receiving at least a first portion of a second type of message word from the ACC;

comparing the received first portion of the second type of message word to an already stored first portion of the second type of message word; and, upon a match, terminating the reception of the second type of message word so as not to receive a second portion of the second type of message word.

11. A method as in claim 10, and further reducing power consumption by inhibiting the reception of a repeat of the second type of message word from the ACC.

12. A method as in claim 11, wherein the second type of message word is a system parameter overhead message (SPOM), and wherein the second portion of the SPOM is a parity bits portion.

13. A mobile station of a type that can be bidirectionally coupled to a network through a wireless interface, comprising:

a receiver for receiving a first portion of a message word from an analog control channel (ACC); and control means coupled to said receiver for determining from the received first portion if the message word is a predetermined type of message word and, if the message word is determined to be the predetermined type of message word, for reducing or switching off the power to said receiver for terminating the reception of the message word so as not to receive a second portion of the message word, thereby reducing the power consumption of the mobile station, wherein the predetermined type of message word is a control-filler message, and wherein the second portion of the message word is comprised of a parity bits portion.

14. A mobile station of a type that can be bidirectionally coupled to a network through a wireless interface, comprising:

a receiver for receiving a first portion of a message word from an analog control channel (ACC); and control means coupled to said receiver for determining from the received first portion if the message word is a predetermined type of message word and, if the message word is determined to be the predetermined type of message word, for reducing or switching off the power to said receiver for terminating the reception of the message word so as not to receive a second portion of the message word, thereby reducing the power consumption of the mobile station, wherein the predetermined type of message word is one that is broadcast to a plurality of mobile stations and that specifies certain network-related information, wherein the predetermined type of message word is a control-filler message, wherein the first portion of the message word is comprised of 28 data bits, and wherein the second portion of the message word is comprised of 12 parity bits.

15. A mobile station of a type that can be bidirectionally coupled to a network through a wireless interface, comprising:

a receiver for receiving a first portion of a message word from an analog control channel (ACC); and control means coupled to said receiver for determining from the received first portion if the message word is a predetermined type of message word and, if the message word is determined to be the predetermined type of message word, for reducing or switching off the power to said receiver for terminating the reception of the message word so as not to receive a second portion of the message word, thereby reducing the power consumption of the mobile station, wherein said control means is comprised of means for comparing less than a total number of bits of the received first portion of the message word to a set of bits that are known to uniquely identify the predetermined type of message word.

16. A mobile station of a type that can be bidirectionally coupled to a network through a wireless interface, comprising:

a receiver for receiving a first portion of a message word from an analog control channel (ACC); and control means coupled to said receiver for determining from the received first portion if the message word is a predetermined type of message word and, if the message word is determined to be the predetermined type of message word, for reducing or switching off the power to said receiver for terminating the reception of the message word so as not to receive a second portion of the message word, thereby reducing the power consumption of the mobile station, wherein the predetermined type of message word is one that is broadcast to a plurality of mobile stations and that specifies certain network-related information, wherein the first portion of the message word is comprised of 28 bits, and wherein said control means is comprised of means for comparing less than 28 bits of the received first portion of the message word to a set of bits that are known to uniquely identify the predetermined type of message word.

17. A mobile station as in claim 16, wherein the set of bits is comprised of 18 bits.

18. A mobile station of a type that can be bidirectionally coupled to a network through a wireless interface, comprising:
a receiver for receiving a first portion of a message word from an analog control channel (ACC); and
control means coupled to said receiver for determining from the received first portion if the message word is a predetermined type of message word and, if the message word is determined to be the predetermined type of message word, for reducing or switching off the power to said receiver for terminating the reception of the message word so as not to receive a second portion of the message word, thereby reducing the power consumption of the mobile station, wherein the predetermined type of message word is one that is broadcast to a plurality of mobile stations and that specifies certain network-related information, wherein the first portion of the message word is comprised of 28 bits, and wherein said control means is comprised of means for comparing all 28 bits of the received first portion of the message word to a set of bits that are known to uniquely identify the predetermined type of message word.

19. A mobile station of a type that can be bidirectionally coupled to a network through a wireless interface, comprising:
a receiver for receiving a first portion of a message word from an analog control channel (ACC); and
control means coupled to said receiver for determining from the received first portion if the message word is a predetermined type of message word and, if the message word is determined to be the predetermined type of message word, for reducing or switching off the power to said receiver for terminating the reception of the message word so as not to receive a second portion of the message word, thereby reducing the power consumption of the mobile station,
wherein said control means is comprised of means for comparing at least some number of bits of the received first portion of the message word to a set of bits that are known to represent the predetermined type of message word, and wherein said control means is operative to periodically update the set of bits.

20. A mobile station as in claim 19, wherein said control means updates the set of control bits in response to the mobile station entering a new paging ACC.

21. A mobile station of a type that can be bidirectionally coupled to a network through a wireless interface, comprising:
a receiver for receiving a first portion of a message word from an analog control channel (ACC); and
control means coupled to said receiver for determining from the received first portion if the message word is a predetermined type of message word and, if the message word is determined to be the predetermined type of message word, for reducing or switching off the power to said receiver for terminating the reception of the message word so as not to receive a second portion of the message word, thereby reducing the power consumption of the mobile station,
wherein said control means further reduces power consumption by inhibiting the reception of repeats of message words from the ACC.

22. A mobile station of a type that can be bidirectionally coupled to a network through a wireless interface, comprising:
a receiver for receiving a first portion of a message word from an analog control channel (ACC); and control means coupled to said receiver for determining from the received first portion if the message word is a predetermined type of message word and, if the message word is determined to be the predetermined type of message word, for reducing or switching off the power to said receiver for terminating the reception of the message word so as not to receive a second portion of the message word, thereby reducing the power consumption of the mobile station, wherein said control means further reduces power consumption by enabling said receiver to receive at least a first portion of a second type of message word from the ACC; for comparing the received first portion of the second type of message word to an already stored first portion of the second type of message word; and, upon a match, for terminating the reception of the second type of message word so as not to receive a second portion of the second type of message word.

23. A mobile station as in claim 22, wherein said control means further reduces power consumption by inhibiting the reception of a repeat of the second type of message word from the ACC.

24. A mobile station as in claim 23, wherein the second type of message word is a system parameter overhead message (SPOM), and wherein the second portion of the SPOM is a parity bits portion.

25. A mobile station of a type that can be bidirectionally coupled to a network through a wireless interface, comprising:
a receiver for receiving a first portion of a message word from an analog control channel (ACC); and
control means coupled to said receiver for determining from the received first portion if the message word is a predetermined type of message word and, if the message word is determined to be the predetermined type of message word, for reducing or switching off the power to said receiver for terminating the reception of the message word so as not to receive a second portion of the message word, thereby reducing the power consumption of the mobile station,
wherein said control means is comprised of:
a first data processor;
a second data processor;
means for comparing less than a total number of bits of the received first portion of the message word to a set of bits that are known to uniquely identify the predetermined type of message word; and
memory means for storing said set of bits; wherein
said comparing means is operative only when obtaining an enabling input from at least one of said first and second data processors.

26. A mobile station as in claim 25, wherein said comparing means is operative only when it obtains an enabling input from both of said first and second data processors.

* * * * *